(12) United States Patent
DeValve (10) Patent No.: US 9,146,040 B2
(45) Date of Patent: Sep. 29, 2015

(54) HEAT PUMP ENABLED DESICCANT DEHUMIDIFICATION SYSTEM

(75) Inventor: Timothy D. DeValve, Manchester, CT (US)

(73) Assignee: CARRIER CORPORATION, Farmington, CT (US)

( * ) Notice: Subject to any disclaimer, the term of this patent is extended or adjusted under 35 U.S.C. 154(b) by 149 days.

(21) Appl. No.: 13/995,255

(22) PCT Filed: Dec. 20, 2010

(86) PCT No.: PCT/US2010/061255
§ 371 (c)(1),
(2), (4) Date: Jun. 18, 2013

(87) PCT Pub. No.: WO2012/087273
PCT Pub. Date: Jun. 28, 2012

(65) Prior Publication Data
US 2013/0269522 A1 Oct. 17, 2013

(51) Int. Cl.
*B01D 53/06* (2006.01)
*F24F 3/14* (2006.01)
*B01D 53/04* (2006.01)

(52) U.S. Cl.
CPC .......... *F24F 3/1429* (2013.01); *B01D 53/0438* (2013.01); *B01D 53/06* (2013.01); *F24F 3/1411* (2013.01); *F24F 3/1423* (2013.01); *B01D 2259/40098* (2013.01); *F24F 2003/144* (2013.01); *F24F 2203/026* (2013.01); *Y02B 30/52* (2013.01)

(58) Field of Classification Search
CPC ...... Y02B 30/52; F24F 3/1411; F24F 3/1423; F24F 3/1429; F24F 2003/144; F24F 2203/026; B01D 53/04; B01D 53/06; B01D 53/0438; B01D 2259/40098

USPC .............. 95/10, 14, 113–115, 117, 121, 122, 95/126; 96/111, 112, 125–128, 146; 34/472, 473, 80
See application file for complete search history.

(56) References Cited

U.S. PATENT DOCUMENTS 4,700,550 A 10/1987 Rhodes
6,434,955 B1 * 8/2002 Ng et al. .......................... 62/106
(Continued)

FOREIGN PATENT DOCUMENTS

EP      1890090 A1   2/2008
WO  WO2006030901 A1  3/2006
WO  WO2007004559 A1  1/2007

OTHER PUBLICATIONS

Machine generated English translation of WO 2007004559 A1, published Jan. 2007.*
(Continued)

*Primary Examiner* — Frank Lawrence
(74) *Attorney, Agent, or Firm* — Cantor Colburn LLP (57) ABSTRACT

A humidity control system including a heat pump with desiccant coated passive heat transfer devices on both sides of the heat pump and an air circulation system for alternately directing a process air stream to be humidity controlled and a separate regenerative air stream past each side. As desiccant on one side becomes laden with moisture, the air streams are redirected to the opposite sides of the heat pump so the regenerative stream can remove moisture from the first side. Simultaneously, the air stream to be humidity controlled uses the previously regenerated desiccant on the second side.

20 Claims, 8 Drawing Sheets

(56) References Cited

U.S. PATENT DOCUMENTS 7,704,305 B2 * 4/2010 Nishida .......................... 96/154
2012/0097029 A1 * 4/2012 Hodgson et al. .................. 95/91

OTHER PUBLICATIONS

PCT International Preliminary Report on Patentability and Written Opinion of the International Searching Authority for International Application No. PCT/US2010/061255, Jul. 4, 2013, 7 pages.

* cited by examiner

HEAT PUMP ENABLED DESICCANT DEHUMIDIFICATION SYSTEM

BACKGROUND

The present invention relates to system and method for energy efficient humidity control independent of temperature.

Air humidity control has historically been important in providing comfortable working and living environments and for the preservation of assets, such as historical documents. Recently, it has become even more critical for certain environments, such as hospital operating theaters, electronics manufacturing facilities and pharmaceutical production process areas. In addition, humidity control improves the economics of refrigeration on, for example, supermarket display cases, by eliminating or reducing defrost cycles or the use of the anti-sweat heater.

Basic humidity reduction is typically accomplished at the cooling coil of an air conditioning system. If the coil temperature is below the dew point of the air stream entering the coil, excess moisture collects on the coils, producing a condensate stream. In such a system, the goal is control of the air stream temperature, with some reduction in humidity. In contrast, by adding a sensor to measure humidity (humidistat), air is cooled as needed, in response to the humidistat, to maintain a desired humidity level. Such systems provide either temperature control or humidity control, but not both. A separate heating or cooling system must be added in series with the humidity control coil to achieve both temperature and humidity control. This can increase energy costs. For example, often the cooling necessary to reach a desired humidity results in overcooling the air stream, requiring subsequent reheating of the air stream to achieve the desired temperature and humidity. Some systems are able to alleviate energy cost penalty by using waste heat elsewhere in the system (e.g., condenser heat). However, the components necessary to reclaim the waste heat and transfer it to the air stream add to the installation cost of the system. Where low-humidity conditions are needed, coil temperatures must be correspondingly low. If the coil temperature is maintained by a vapor compression system, the compressor must work harder and use more energy to reach the lower temperature, resulting in a reduced chiller coefficient of performance (COP).

Other mature technologies exist for dehumidification, other than by a cooling coil. Desiccant wheels and enthalpy wheels, honeycombed wheels having surfaces covered with a solid desiccant, such as silica gel, are often used to remove moisture from an air stream. The wheels rotate between supply and exhaust air streams to transfer water and heat between them. Desiccant wheels can achieve very low dew points by using a heated exhaust air stream to greatly enhance the removal of adsorbed water, creating a very dry desiccant for contact with the supply air stream. Such a system needs a lot of energy to heat the exhaust air and additional cooling of the supply air stream to remove heat transferred from the exhaust air to the wheel and subsequently to the supply air stream. In contrast, enthalpy wheels have a lighter coating of desiccant and are primarily designed to transfer energy in the forms of heat (sensible heat) and moisture (latent heat) from one stream to another without any additional energy. The amount of moisture removed depends on the dryness of the exhaust air. As such, enthalpy wheels are more limited than desiccant wheels regarding the level of humidity control they can maintain. Combinations of desiccant and enthalpy wheels, along with the use of waste heat from elsewhere or water for evaporative cooling, can improve the level of humidity control as well as the energy efficiency of the system, but at a significant penalty in initial cost and complexity of the system.

Liquid desiccant dehumidifiers are another currently available alternative for removing moisture from air. A hygroscopic fluid (one that readily adsorbs water from the air), such as a LiCl solution, circulates between supply and exhaust air streams. The solution picks up moisture from the supply air stream, essentially diluting the solution, which then circulates to the exhaust air stream where heat evaporates the excess moisture into the exhaust air stream. In addition to the energy needed to heat the liquid to evaporate the moisture on the exhaust air side, additional energy is necessary on the supply air side to remove the heat of condensation either by subcooling the liquid before contact with the supply air or by cooling the supply air after dehumidification. As with the systems discussed above, to ease this energy penalty, waste heat from elsewhere can be used to evaporate the moisture, at higher initial cost and complexity for the system.

A disadvantage of liquid desiccant dehumidifiers stems from the often corrosive nature of the liquid desiccant and the direct contact between the corrosive solution and the air being dehumidified. The dehumidified air can pick up corrosive vapors from this direct contact and transport them downstream. Sensitive downstream components can be damaged and people injured by exposure to such corrosive vapors.

SUMMARY

The present invention provides a system for achieving exceptional humidity control using a heat pump combined with a desiccant. The desiccant is coated on exposed surfaces of passive heat transfer devices in thermal and physical contact with either side of the heat pump, providing a surface area for the adsorption/desorption of moisture. A control system creates a cyclical process whereby in a first part of the cycle, the desiccant on the cool side of the heat pump adsorbs moisture from a process air stream to be dehumidified and pumps the associated heat of condensation to the hot side of the heat pump which is located outside of the process air stream. A regenerative air stream flows past the hot side of the heat pump, carrying away the heat of condensation and regenerating the moisture laden desiccant on the surface. In a second part of the cycle, the relative positions of the passive heat transfer devices and the air streams are exchanged and the direction of heat flow across the heat pump is reversed. Freshly recharged desiccant is again exposed to the process air stream to continue dehumidification; the moisture laden desiccant is exposed to the regenerative air stream for regeneration of the desiccant; and the heat of condensation is once again pumped from the process air stream to the regenerative air stream.

DETAILED DESCRIPTION

Figure 1A:
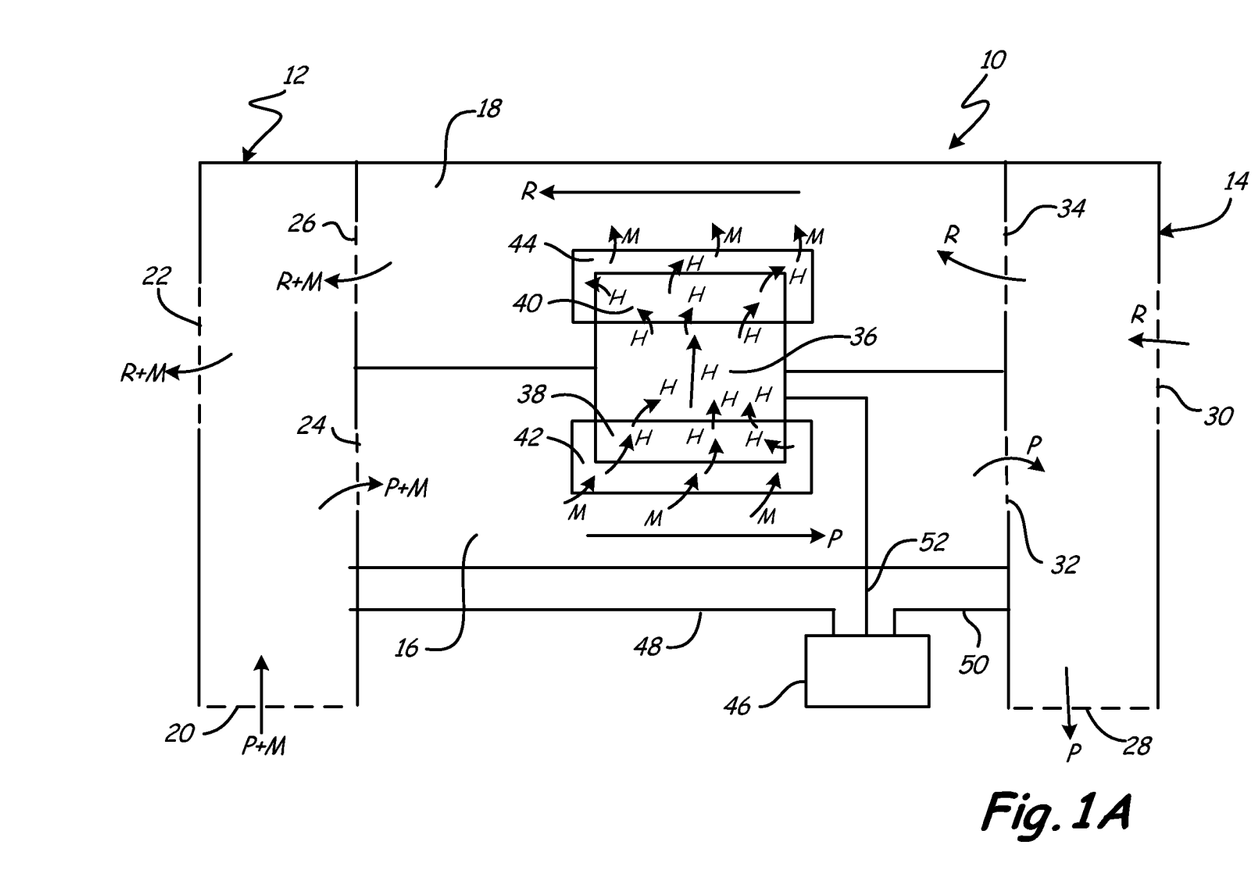
FIGS. 1A and 1B are schematic views of a dehumidification system formed by a heat pump and desiccant-coated heat transfer devices operating in each of the two modes.
Figure 1B:
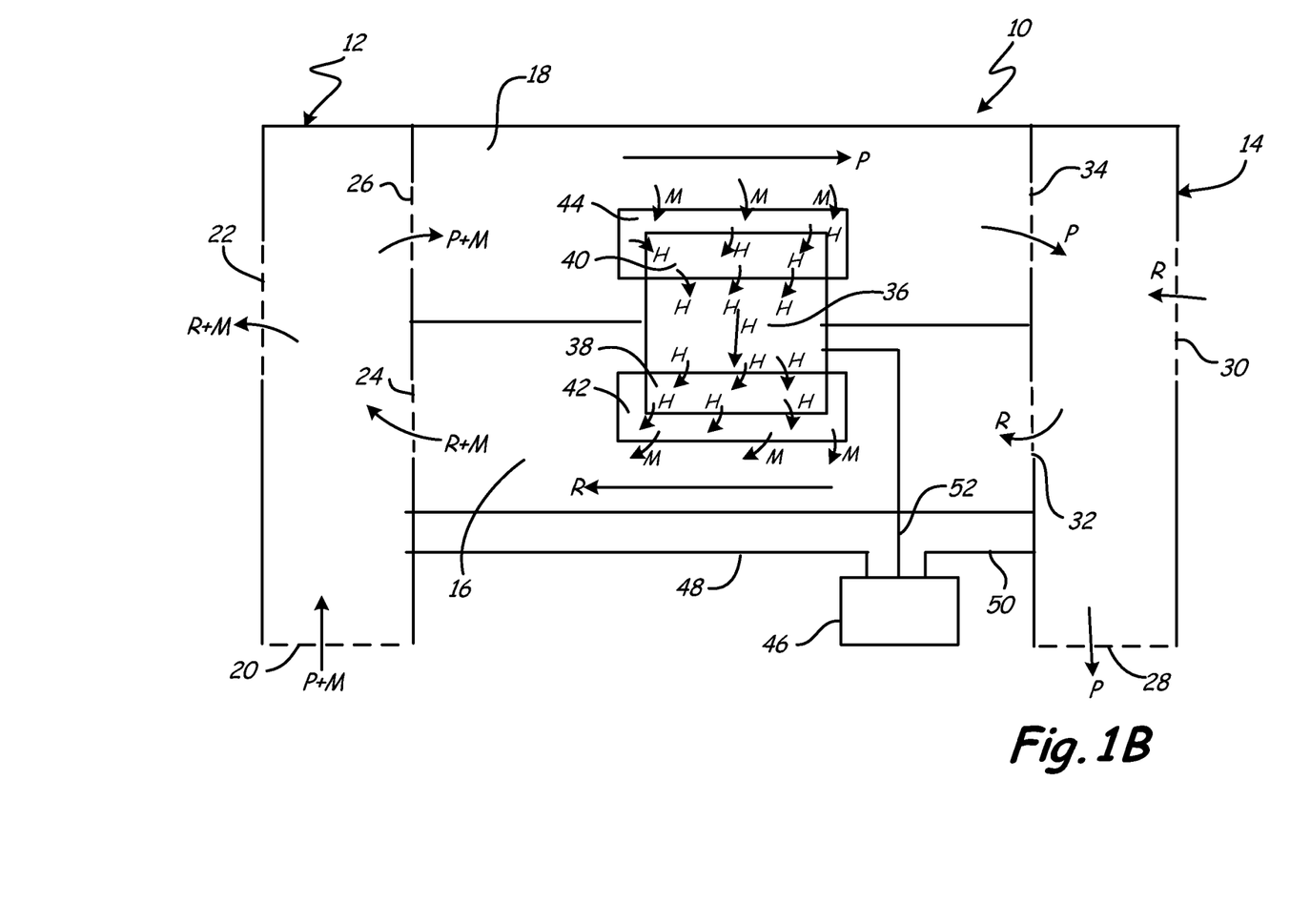

FIGS. 1A and 1B are schematic views of one embodiment of the present invention; a heat pump enabled desiccant dehumidification system 10. In operation, the dehumidification system 10 cycles between two modes. FIGS. 1A and 1B illustrate these two modes of operation. Dehumidification system 10 includes first control baffle device 12, second control baffle device 14, first air duct 16, and second air duct 18. First control baffle device 12 has process air stream entrance 20, regenerative air stream exit 22, first air duct connection 24 and second air duct connection 26. Second control baffle device 14 has process air stream exit 28, regenerative air stream entrance 30, first air duct connection 32 and second air duct connection 34. The interior mechanisms of first control baffle device 12 and second control baffle device 14 are well known in the art and are not shown. Dehumidification system 10 also includes heat pump 36, first passive heat transfer device 38, second passive heat transfer device 40, desiccant material 42 and desiccant material 44. Control system elements include controller 46 and communication lines 48, 50, and 52.

As shown in FIGS. 1A and 1B, heat pump 36 is located between first air duct 16 and second air duct 18. First passive heat transfer device 38 and second passive heat transfer device 40 are physically and thermally attached to heat pump 36, on opposite sides of heat pump 36, with first passive heat transfer device 38 located in first air duct 16 and second heat transfer device 40 located in second air duct 18. First passive heat transfer device 38 has exposed surfaces that are coated with desiccant 42. Similarly, second passive heat transfer device 40 has exposed surfaces that are coated with desiccant 44. One end of first air duct 16 is connected to first control baffle device 12 at first air duct connection 24 and the other end is connected to second control baffle device 14 at first air duct connection 32. Similarly, one end of second air duct 18 is connected to first control baffle device 12 at second air duct connection 26 and the other end is connected to second control baffle device 14 at second air duct connection 34. Communication line 48 connects controller 46 with first control baffle device 12; communication line 50 connects controller 46 with second control baffle device 14; and communication line 52 connects controller 46 with heat pump 36.

FIG. 1A illustrates the operation of dehumidification system 10 in the first mode of operation. Process air stream P laden with moisture M to be removed enters dehumidification system 10 by way of first control baffle device 12 through process air stream entrance 20. First control baffle device 12, in response to a signal from controller 46 by communication line 48 directs process air stream P to first air duct connection 24 and into first air duct 16. In first air duct 16, process air stream P flows past the exposed surfaces of first passive heat transfer device 38. Desiccant material 42 coating the exposed surfaces of first passive heat transfer device 38 adsorb moisture M from process air stream P, thereby dehumidifying process air stream P. As moisture M is adsorbed by desiccant material 42, heat H from the condensation of moisture M transfers by conduction to first passive heat transfer device 38 and then to heat pump 36. Heat pump 36 operates to pump heat H from first passive heat transfer device 38 to second passive heat transfer device 40. The dehumidified process air stream P flows into second control baffle device 14 through first air duct connection 32. Second control baffle device 14, in response to a signal from controller 46 by communication line 50 directs process air stream P to process air stream exit 28. The dehumidified process air stream P leaves dehumidification system 10 through process air stream exit 28.

Simultaneously, regenerative air stream R enters dehumidification system 10 by way of second control baffle device 14 through regenerative air stream entrance 30. Second control baffle device 14, in response to a signal from controller 46 by communication line 50 directs regenerative air stream R to second air duct connection 34 and into second air duct 18. In second air duct 18, regenerative air stream R flows past the exposed surfaces of second passive heat transfer device 40. Desiccant material 44 coating the exposed surfaces of second passive heat transfer device 40 has, in a previous mode (shown in FIG. 1B), adsorbed moisture M. Heat H, supplied as indicated above by way of heat pump 36, transfers by conduction from second passive heat transfer device 40 to desiccant material 44 providing the heat of evaporation required to evaporate moisture M into regenerative air stream R where it is carried away, thereby regenerating desiccant material 44. Regenerative air stream R, now laden with moisture M, flows into first control baffle device 12 through first air duct connection 26. First control baffle device 12, in response to a signal from controller 46 by communication line 48 directs regenerative air stream R to regenerative air stream exit 22. The regenerative air stream R leaves dehumidification system 10 through regenerative air stream exit 22, carrying moisture M with it.

FIG. 1B illustrates the operation of dehumidification system 10 in the second mode of operation. As desiccant material 42 becomes saturated with moisture M, controller 46, in response to a time limit or some other indicator, signals first control baffle device 12 by communication line 48 to redirect process air stream P to second air duct connection 26 and into second air duct 18 and to direct flow from first air duct connection 24 to regenerative air stream exit 22. At the same time, controller 46 signals second control baffle device 14 by communication line 50 to redirect regenerative air stream R to first air duct connection 32 and into first air duct 16 and to direct flow from second air duct connection 34 to process air stream exit 28. Simultaneously, controller 46 signals heat pump 36 by communication line 52 to reverse the direction of heat flow and to pump heat from second passive heat transfer device 40 to first passive heat transfer device 38.

Now in the second air duct 18, process air stream P flows past the exposed surfaces of second passive heat transfer device 40. Freshly regenerated desiccant material 44 coating the exposed surfaces of second passive heat transfer device 40 adsorb moisture M from process air stream P, thereby continuing dehumidification of process air stream P. As moisture M is adsorbed by desiccant material 44, heat H from the condensation of moisture M transfers by conduction to second passive heat transfer device 40 and then to heat pump 36. Heat pump 36, operating in reverse direction, pumps heat H from second passive heat transfer device 40 to first passive heat transfer device 38. The dehumidified process air stream P flows into second control baffle device 14 through second air duct connection 34 and leaves dehumidification system 10 through process air stream exit 28.

Simultaneously, regenerative air stream R now in first air duct 16 flows past the exposed surfaces of first passive heat transfer device 38. Desiccant material 42 coating the exposed surfaces of first passive heat transfer device 38 has, in the previous mode, adsorbed moisture M. Heat H transfers by conduction from first passive heat transfer device 38 to desiccant material 42 providing the heat of evaporation required to evaporate moisture M into regenerative air stream R where it is carried away, thereby regenerating desiccant material 42. Regenerative air stream R, now laden with moisture M, flows into first control baffle device 12 through second air duct connection 24 and leaves dehumidification system 10 through regenerative air stream exit 22, carrying moisture M with it.

It should be noted that as long as regenerative air stream R is not saturated with moisture, it does not need to be heated above the temperature of process air stream P, because the extra energy for evaporation is supplied by the heat pump 36. Also in the present invention, unlike a liquid desiccant system, the process air stream P is maintained at a relatively constant temperature by pumping away the heat of condensation, so no sub-cooling of the process air stream is needed to counter heating of the process air stream from the heat of condensation. These features provide energy savings.

Another aspect of the present invention is its simplicity and safety. Controller 46 cycles process air stream P and regenerative air stream R between the two sides of heat pump 36. This simple arrangement eliminates the pumping of a corrosive, moisture-containing fluid around a system, in contrast to a liquid-desiccant dehumidifier. Moisture is merely adsorbed and desorbed from the same surface in a fixed location. No corrosive liquids are used. This reduces the risk of damage to sensitive downstream components and injury to people from exposure to such corrosive vapors.

Desiccants useful in the present invention are well known in the art. Silica gel is one example of a suitable desiccant material. Control system elements including controller 46, first control baffle device 12, second control baffle device 14 and communication lines 48, 50, 52 and associated devices necessary to switch the process air stream P and regenerative air stream R between modes are also well known in the art.

In one embodiment of dehumidification system 10, heat pump 36 is a thermoelectric device and first passive heat transfer device 38 and second passive heat transfer device 40 are heat exchangers with desiccant-coated fins. The thermoelectric device is a preferred heat pump because it is more efficient, compact, and quiet than alternatives, such as a vapor compression heat pump. The thermoelectric device is easily controlled, with the amount and direction of heat pumped merely a function of the direction and quantity of voltage applied to the thermoelectric device.

Figure 2A:
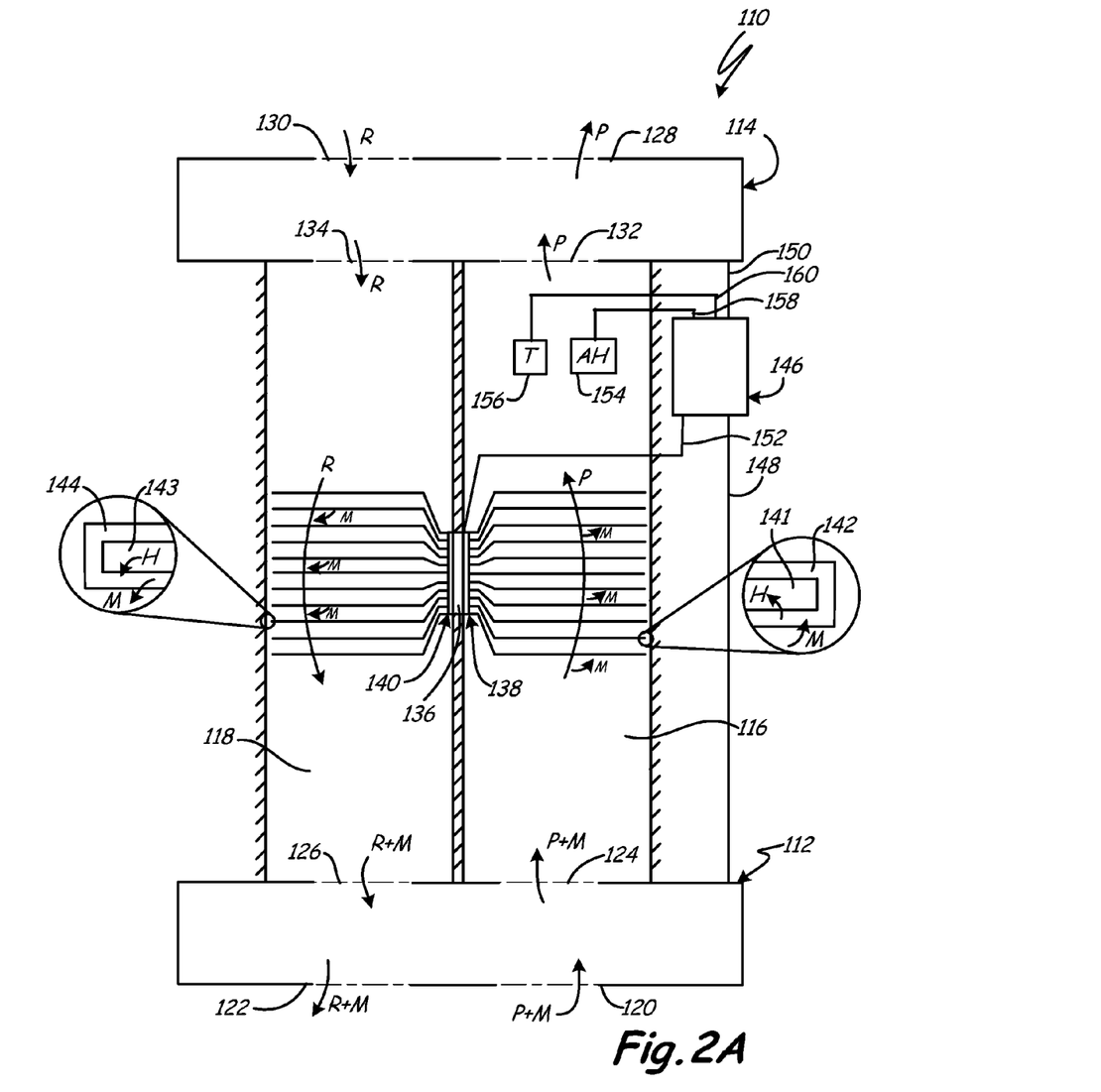
FIGS. 2A and 2B are schematic views of a preferred embodiment of a dehumidification system formed by a thermoelectric device and heat exchangers with desiccant-coated fins operating in each of the two modes.
Figure 2B:
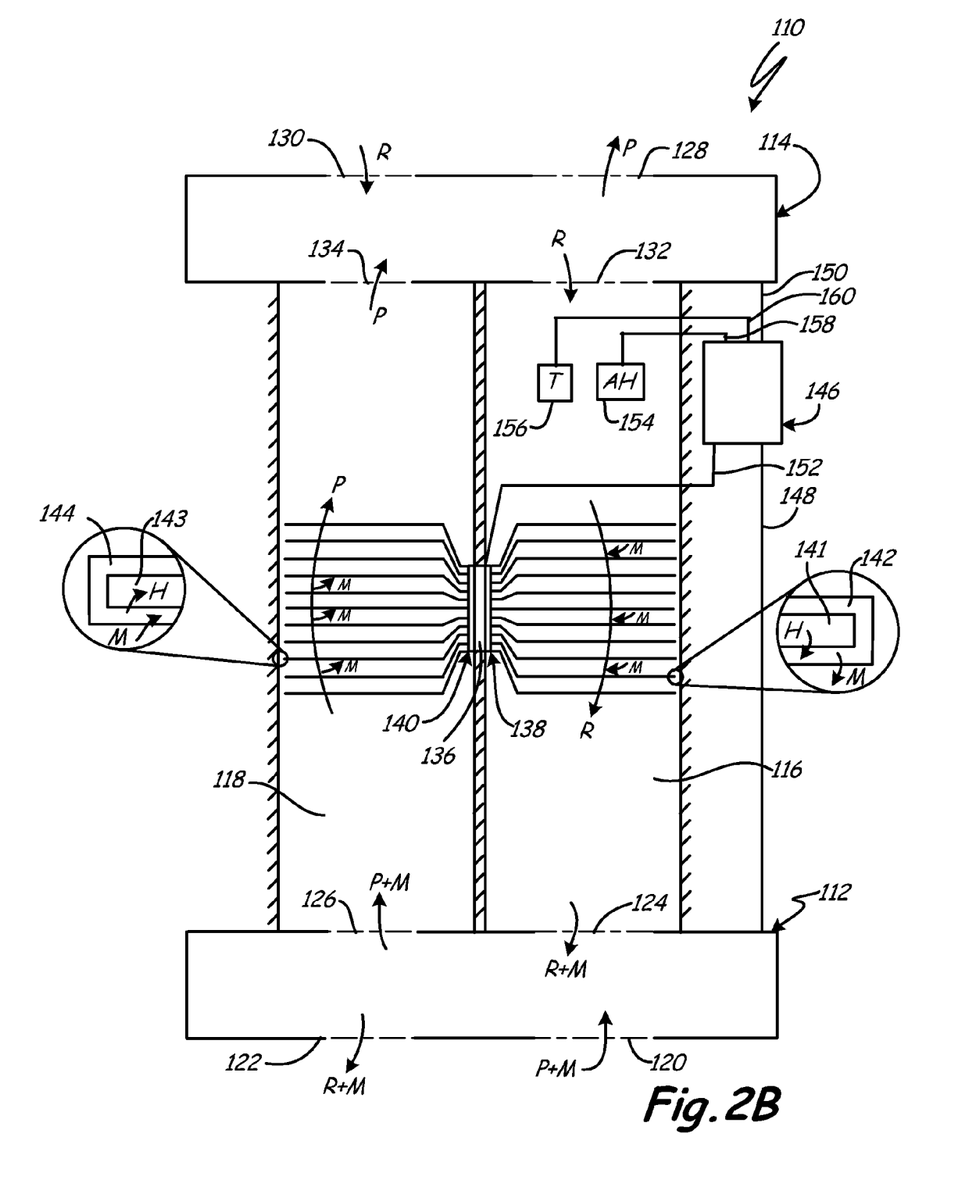

FIGS. 2A and 2B show such an embodiment with a schematic View of dehumidification system 110. Dehumidification system 110 includes first control baffle device 112, second control baffle device 114, first air duct 116, and second air duct 118. First control baffle device 112 has process air stream entrance 120, regenerative air stream exit 122, first air duct connection 124 and second air duct connection 126. Second control baffle device 114 has process air stream exit 128, regenerative air stream entrance 130, first air duct connection 132 and second air duct connection 134. The interior mechanisms of first control baffle device 112 and second control baffle device 114 are well known in the art and are not shown. Dehumidification system 110 also includes thermoelectric device 136, first heat exchanger 138 with a plurality of fins 141, second heat exchanger 140 with a plurality of fins 143, desiccant material 142 and desiccant material 144. Also shown in the embodiment of FIGS. 2A and 2B, dehumidification system 110 includes humidity sensor 154 and temperature sensor 156. Control system elements include controller 146 and communication lines 148, 150, 152, 158, and 160.

As shown in FIGS. 2A and 2B, thermoelectric device 136 is located between first air duct 116 and second air duct 118. First heat exchanger 138 and second heat exchanger 140 are physically and thermally attached to thermoelectric device 136, on opposite sides of thermoelectric device 136, with first heat exchanger 138 located in first air duct 116 and second heat transfer device 140 located in second air duct 118. The exposed surfaces of fins 141 of first heat exchanger 138 are coated with desiccant 142. Similarly, the exposed surfaces of fins 143 of second heat exchanger 140 are coated with desiccant 144. One end of first air duct 116 is connected to first control baffle device 112 at first air duct connection 124 and the other end is connected to second control baffle device 114 at first air duct connection 132. Similarly, one end of second air duct 118 is connected to first control baffle device 112 at second air duct connection 126 and the other end is connected to second control baffle device 114 at second air duct connection 134. Humidity sensor 154 and temperature sensor 156 are located in first air duct 116. Communication line 148 connects controller 146 with first control baffle device 112; communication line 150 connects controller 146 with second control baffle device 114; communication line 152 connects controller 146 with thermoelectric device 136; communication line 158 connects controller 146 with humidity sensor 154; and communication line 160 connects controller 146 with temperature sensor 156.

FIG. 2A illustrates the operation of dehumidification system 110 in the first mode of operation. Process air stream P laden with moisture M to be removed enters dehumidification system 110 by way of first control baffle device 112 through process air stream entrance 120. First control baffle device 112, in response to a signal from controller 146 by communication line 148 directs process air stream P to first air duct connection 124 and into first air duct 116. In first air duct 116, process air stream P flows past the exposed surfaces of fins 141 of first heat exchanger 138. Desiccant material 142 coating the exposed surfaces of fins 141 adsorb moisture M from process air stream P, thereby dehumidifying process air stream P. As moisture M is adsorbed by desiccant material 142, heat H from the condensation of moisture M transfers by conduction to fins 141, then to first heat exchanger 138, and then to thermoelectric device 136. Thermoelectric device 136 operates to pump heat H from first heat exchanger 138 to second heat exchanger 140. The dehumidified process air stream P flows into second control baffle device 114 through first air duct connection 132. Second control baffle device 114, in response to a signal from controller 146 by communication line 150 directs process air stream P to process air stream exit 128. The dehumidified process air stream P leaves dehumidification system 110 through process air stream exit 128.

Simultaneously, regenerative air stream R enters dehumidification system 110 by way of second control baffle device 114 through regenerative air stream entrance 130. Second control baffle device 114, in response to a signal from controller 146 by communication line 150 directs regenerative air stream R to second air duct connection 134 and into second air duct 118. In second air duct 118, regenerative air stream R flows past the exposed surfaces of fins 143 of second heat exchanger 140. Desiccant material 144 coating the exposed surfaces of fins 143 has, in a previous mode (shown in FIG. 2B), adsorbed moisture M. Heat H, supplied as indicated above by way of thermoelectric device 136, transfers by conduction from second heat exchanger 140 to fins 143, and then to desiccant material 144, providing the heat of evaporation required to evaporate moisture M into regenerative air stream R where it is carried away, thereby regenerating desiccant material 144. Regenerative air stream R, now laden with moisture M, flows into first control baffle device 112 through first air duct connection 126. First control baffle device 112, in response to a signal from controller 146 by communication line 148, directs regenerative air stream R to regenerative air stream exit 122. The regenerative air stream R leaves dehumidification system 110 through regenerative air stream exit 122, carrying moisture M with it.

FIG. 2B illustrates the operation of dehumidification system 110 in the second mode of operation. As desiccant material 142 becomes saturated with moisture M, controller 146, in response to signals from humidity sensor 154 by way of communication line 158, temperature sensor 156 by way of communication line 160, a time limit, and/or other indicators, signals first control baffle device 112 by communication line 148 to redirect process air stream P to second air duct connection 126 and into second air duct 118 and to direct flow from first air duct connection 124 to regenerative air stream exit 122. At the same time, controller 146 signals second control baffle device 114 by communication line 150 to redirect regenerative air stream R to first air duct connection 132 and into first air duct 116 and to direct flow from second air duct connection 134 to process air stream exit 128. Simultaneously, controller 146 signals thermoelectric device 136 by communication line 152 to reverse the direction of heat flow and to pump heat from second heat exchanger 140 to first heat exchanger 138.

Now in the second air duct 118, process air stream P flows past the exposed surfaces of fins 143 of second heat exchanger 140. Freshly regenerated desiccant material 144 coating the exposed surfaces of fins 143 adsorb moisture M from process air stream P, thereby continuing dehumidification of process air stream P. As moisture M is adsorbed by desiccant material 144, heat H from the condensation of moisture M transfers by conduction to fins 143, then to second heat exchanger 140 and then to thermoelectric device 136. Thermoelectric device 136, operating in reverse direction, pumps heat H from second heat exchanger 140 to first heat exchanger 138. The dehumidified process air stream P flows into second control baffle device 114 through second air duct connection 134 and leaves dehumidification system 10 through process air stream exit 128.

Simultaneously, regenerative air stream R now in first air duct 116 flows past the exposed surfaces of fins 141 of first heat exchanger 138. Desiccant material 142 coating the exposed surfaces of fins 141 has, in the previous mode, adsorbed moisture M. Heat H transfers by conduction from first heat exchanger 138, to fins 141, and then to desiccant material 142 providing the heat of evaporation required to evaporate moisture M into regenerative air stream R where it is carried away, thereby regenerating desiccant material 142. Regenerative air stream R, now laden with moisture M, flows into first control baffle device 112 through second air duct connection 124 and leaves dehumidification system 110 through regenerative air stream exit 122, carrying moisture M with it.

In the embodiment of FIGS. 2A and 2B, dehumidification system 110 includes humidity sensor 154 and temperature sensor 156. Although only a single sensor each is shown and only in first air duct 116, those skilled in the art will recognize that additional sets of humidity and temperature sensors located in multiple locations throughout both air ducts can improve the efficient operation of dehumidification system 10. With temperature and humidity data available, controller 146 can modulate between the two operational modes and modulate power to thermoelectric device 136 to achieve the necessary dehumidification of process air stream P without changing its temperature. As mentioned above, this separation of humidity control and temperature control permits the air conditioning system (not shown) to run at maximum efficiency. Further, using the heat of condensation to provide the heat of evaporation necessary to regenerate the desiccant material adds to the energy efficiency of the entire system. Combining dehumidification system 110 with a conventional air conditioning system can reduce energy consumption by 25% or more. Alternatively, by modulating the heat flow across the thermoelectric device to control humidity and temperature, while modulating between the two operational modes to control the humidity, both humidity and temperature are controlled without the need for a separate cooling system, eliminating significant equipment costs.

In another embodiment of dehumidification system 10, heat pump 36 is located at the hub of a wheel and first passive heat transfer device 38 and second passive heat transfer device 40 are halves of the wheel permeable to air (e.g. honeycombed, finned, etc.) with desiccant material 42 and desiccant material 44 coating the wheel surfaces of each wheel half exposed to air. This embodiment is similar in operation to the desiccant wheels and enthalpy wheels described above in that the air streams flow through the wheel. However, with this invention, unlike a desiccant wheel, the regenerative air stream need not be heated to dry out the desiccant. In addition, unlike an enthalpy wheel, the operation is not limited by the dryness of the regenerative air stream, provided it is not saturated.

Figure 3:
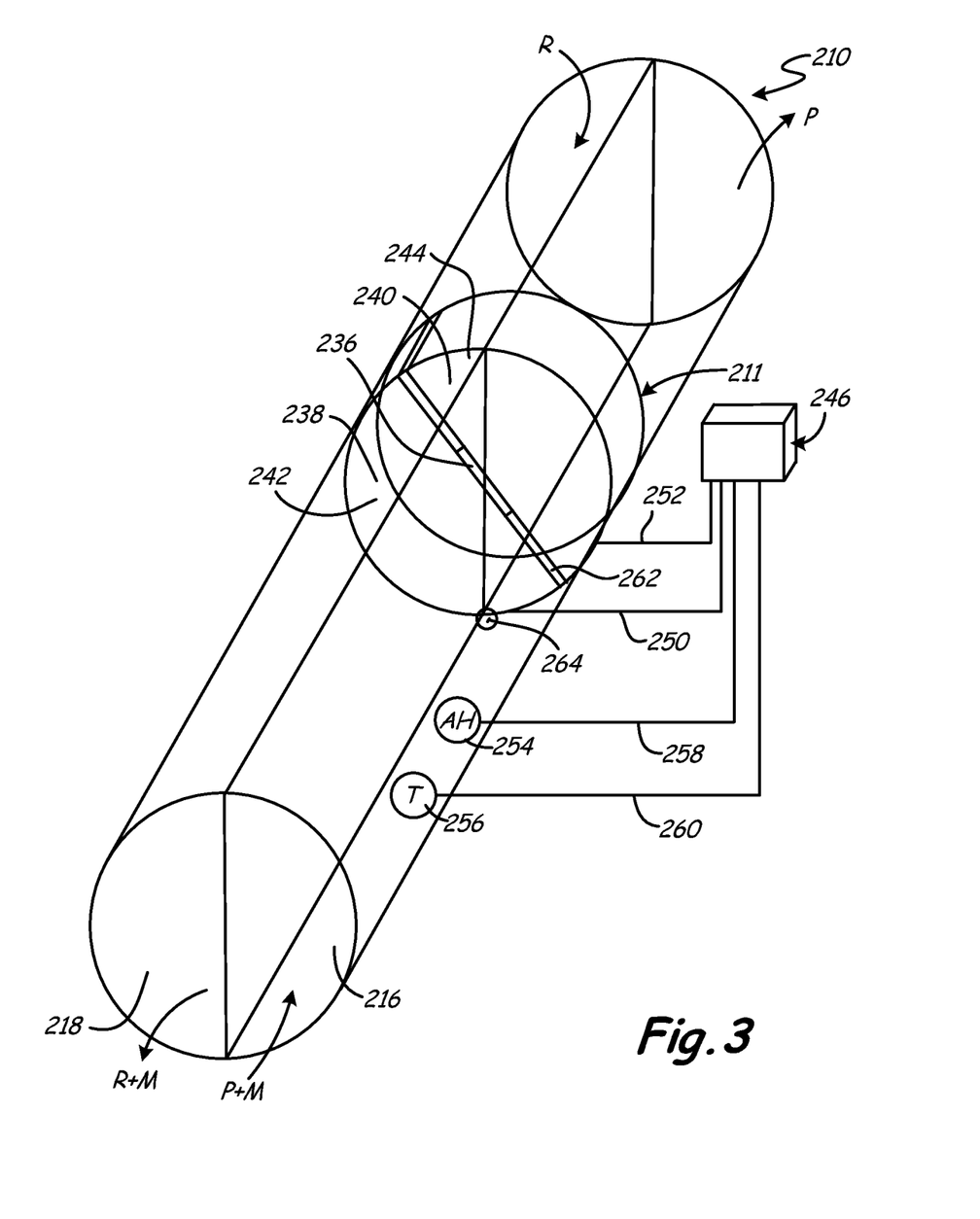
FIG. 3 is a perspective view of another embodiment of a dehumidification system formed of wheel-shaped heat transfer devices, a thermoelectric device at the center of the wheel and desiccant coating the surfaces of the wheel-shaped heat transfer devices.

FIG. 3 shows such an embodiment with a schematic view of dehumidification system 210. Dehumidification system 210 includes wheel-shaped heat transfer device 211, first air duct 216, second air duct 218, controller 246, humidity sensor 254, temperature sensor 256, wheel motor/driver 264, and communication lines 250, 252, 258 and 260. Wheel-shaped heat transfer device 211 is comprised of thermoelectric device 236, first wheel section 238, second wheel section 240, desiccant material 242, desiccant material 244 and wheel section isolator 262.

As shown in FIG. 3, wheel-shaped heat transfer device 211 is located in both first air duct 216 and second air duct 218. Wheel motor/driver 264 is adjacent wheel-shaped heat transfer device 211. Humidity sensor 254 and temperature sensor 256 are located in first air duct 216, upstream of wheel-shaped heat transfer device 211. Controller 246 is connected to thermoelectric device 236 by communication line 252, humidity sensor 254 by communication line 258, temperature sensor 256 by communication line 260, and wheel motor/driver 264 by communication line 250. First wheel section 238 and second wheel section 240 are physically and thermally connected to opposite sides of thermoelectric device 236 located at the hub of wheel-shaped heat transfer device 211. First wheel section 238 and second wheel section 240 are also physically connected to, but thermally isolated from each other, by wheel section isolator 262. Each wheel section is permeable to air with large exposed surface areas. The exposed surfaces of first wheel section 238 are coated with desiccant material 242. Similarly, the exposed surfaces of second wheel section 240 are coated with desiccant material 244. Desiccants useful for this invention are well known in the art. Silica gel is one example of a suitable desiccant material.

In the operation of dehumidification system 210 shown in FIG. 3, wheel-shaped heat transfer device 211 rotates between first air duct 216 containing process air stream P and second air duct 218 containing regenerative air stream R. Unlike the previously described embodiment which operates in two modes, the wheel-shaped heat transfer device 211 of dehumidification system 210 can operate in two modes or rotate continuously between air ducts 216 and 218.

Figure 4A:
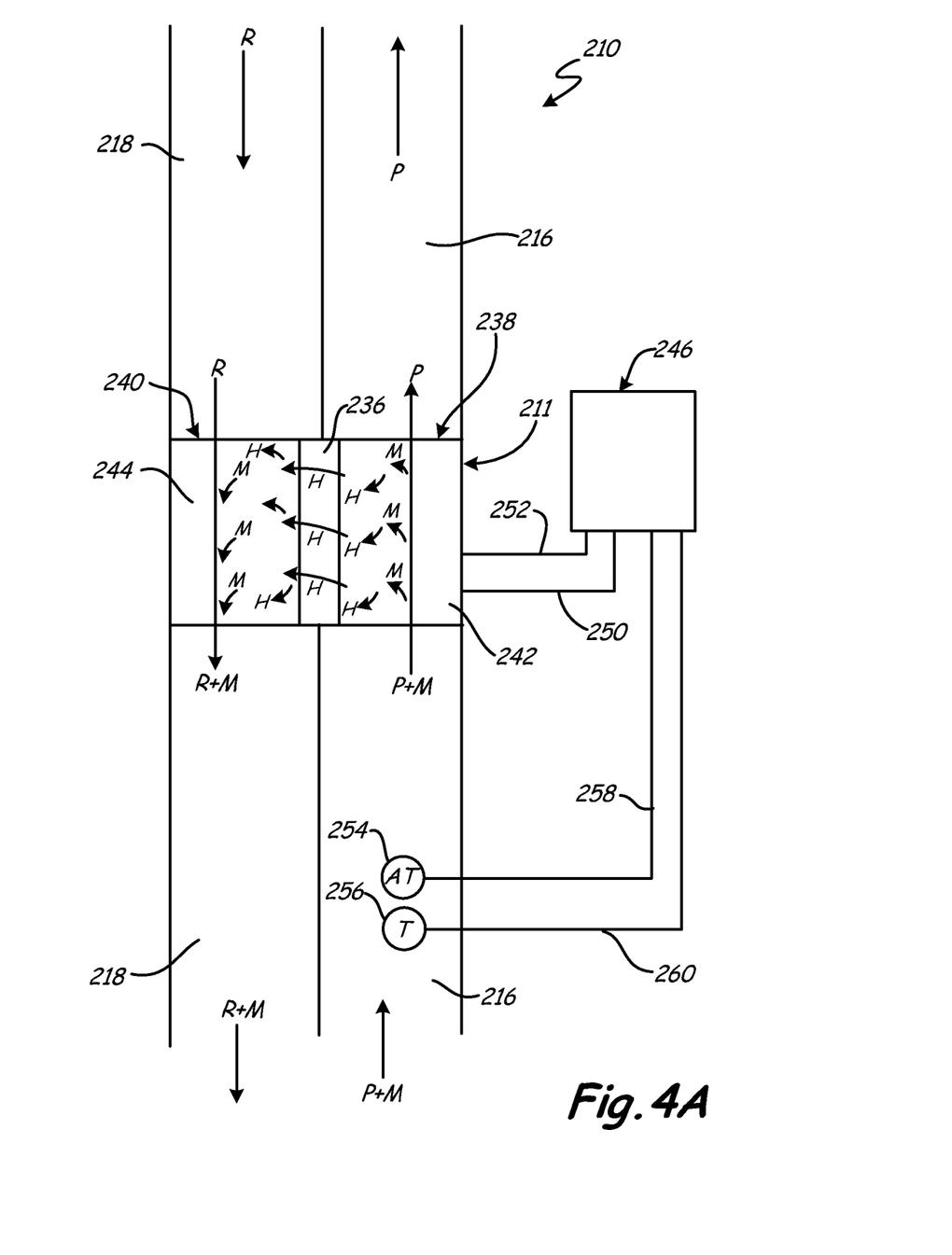
FIGS. 4A and 4B are schematic views of the top of the dehumidification system of FIG. 3 showing each mode of operation when the system is operated in two modes.
Figure 4B:
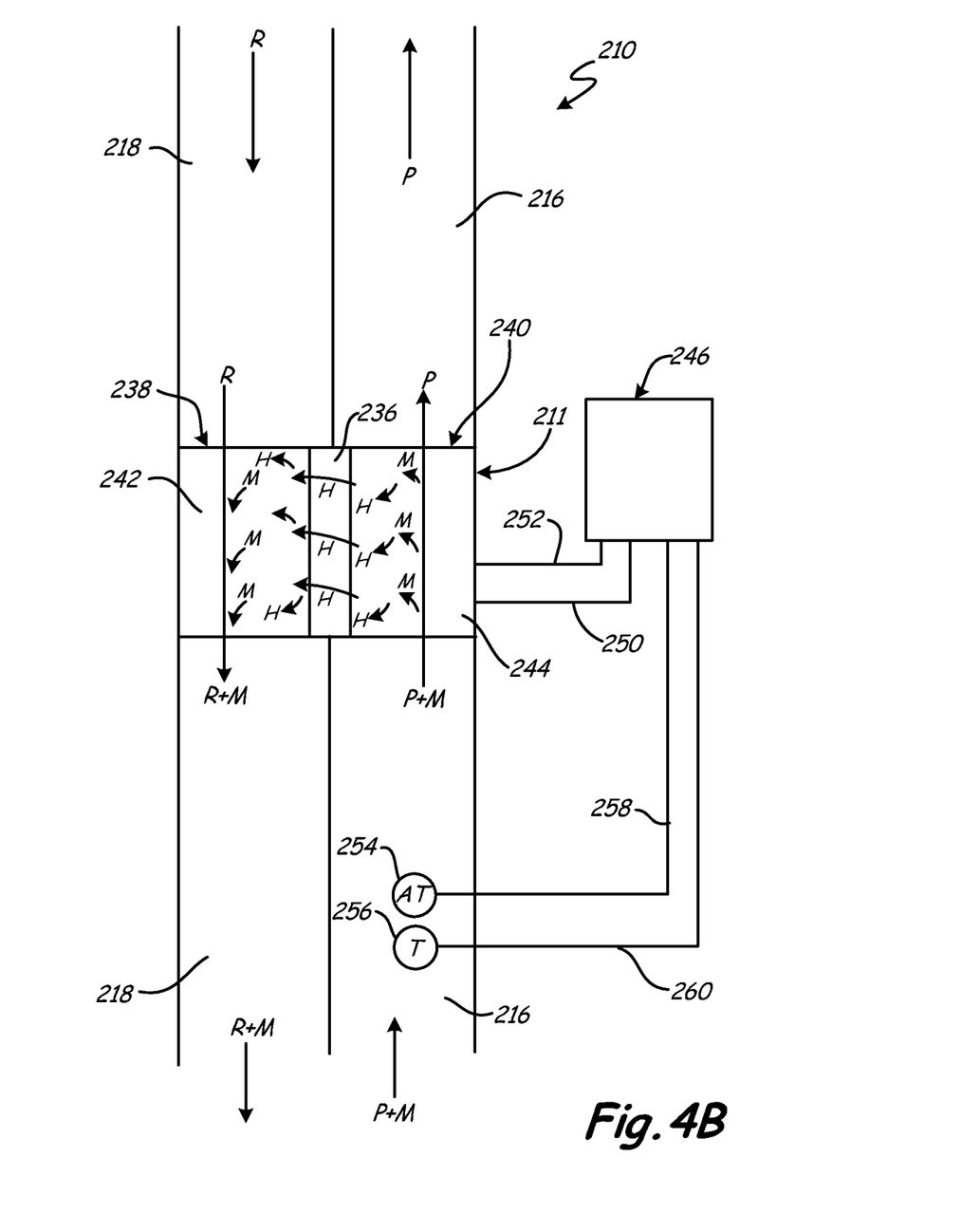

FIGS. 4A and 4B are schematic views from the top of dehumidification system 210 showing each mode of operation when dehumidification system 210 is operated in two modes. The identification and arrangement of components is as described in FIG. 3. Process air stream P, laden with moisture M to be removed, flows through first air duct 216 and enters first wheel section 238 of wheel-shaped heat transfer device 211 as it rotates through first air duct 216. Desiccant material 242 adsorbs moisture M from process air stream P, thereby dehumidifying process air stream P. As moisture M is adsorbed by desiccant material 242, heat H from the condensation of moisture M transfers by conduction to first wheel section 238 and then to thermoelectric device 236. Thermoelectric device 236 operates to pump heat H from first wheel section 238 to second wheel section 240. The dehumidified process air stream P exits first wheel section 238 and moves into first air duct 216 downstream of wheel-shaped heat transfer device 211 and out of dehumidification system 210.

When first wheel section 238 is located in first air duct 216, second wheel section 240 is located in second air duct 218. Regenerative air stream R flows through second air duct 218 and enters second wheel section 240 where it contacts desiccant material 244. Desiccant material 244 on second wheel section 240 has previously adsorbed moisture M. Heat H, supplied as indicated above by way of thermoelectric device 236, transfers by conduction from thermoelectric device 236 through second wheel section 240 to desiccant material 244. This conduction provides the heat of evaporation required to evaporate moisture M into regenerative air stream R where it is carried away, thereby regenerating desiccant material 244. Regenerative air stream R, laden with moisture M, exits second wheel section 240 and flows into second air duct 218 downstream of wheel-shaped heat transfer device 211 and out of dehumidification system 210 carrying moisture M with it.

FIG. 4B shows the second mode of operation. In the second mode of operation, desiccant material 242 becomes saturated with moisture M, controller 246, in response to signals from humidity sensor 254 by way of communication line 258, temperature sensor 256 by way of communication line 260, a time limit and/or other indicators, signals wheel motor/driver 264 (not shown) by way of communication line 250 to rotate wheel-shaped heat transfer device 211. As wheel-shaped heat transfer device 211 rotates, first wheel section 238 with its cargo of adsorbed moisture M enters second air duct 218 containing regenerative air stream R while second wheel section 240 with its freshly regenerated desiccant 244 enters first air duct 216. As this happens, controller 246 signals thermoelectric device 236 by way of communication line 252 to reverse the direction of heat flow and to pump heat from second wheel section 240 to first wheel section 238.

Process air stream P, flowing through first air duct 216, now flows past the exposed surfaces of second wheel section 240. Freshly regenerated desiccant material 244 coating the exposed surfaces of second wheel section 240 adsorbs moisture M from process air stream P, thereby continuing to dehumidify process air stream P. As moisture M is adsorbed by desiccant material 244, heat H from the condensation of moisture M transfers by conduction through second wheel section 240 and then to thermoelectric device 236. Thermoelectric device 236, operating in reverse direction, pumps heat H from second wheel section 240 to first wheel section 238. The dehumidified process air stream P exits second wheel section 240 and moves into first air duct 216 downstream of wheel-shaped heat transfer device 211 and out of dehumidification system 210.

When second wheel section 240 is located in first air duct 216, first wheel section 238 is located in second air duct 218. Regenerative air stream R, flowing through second air duct 218, enters first wheel section 238 where it contacts desiccant material 242. Desiccant material 242 on second wheel section 238 has previously adsorbed moisture M. Heat H supplied, as indicated above, by way of thermoelectric device 236, transfers by conduction from thermoelectric device 236 through first wheel section 238 to desiccant material 242. This conduction provides the heat of evaporation required to evaporate moisture M into regenerative air stream R where it is carried away, thereby regenerating desiccant material 242. Regenerative air stream R, laden with moisture M, exits second wheel section 238 and flows into second air duct 218 downstream of wheel-shaped heat transfer device 211 and out of dehumidification system 210 carrying moisture M with it.

The rotary operation of the embodiment of FIGS. 3, 4A, and 4B allows for efficient air flow with no need for baffles. As mentioned above, the embodiment of FIGS. 3, 4A and 4B can be operated in a continuous mode as well.

Figure 5A:
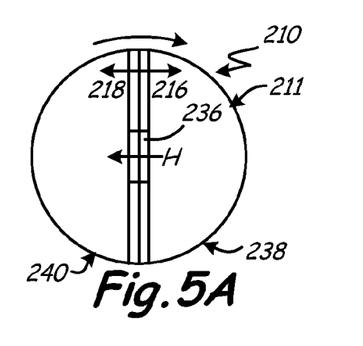
FIGS. 5A-5G are schematic views illustrating the continuous operation of the dehumidification system of FIG. 3.
Figure 5B:
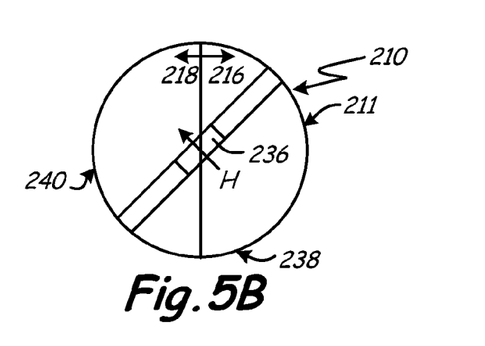
Figure 5C:
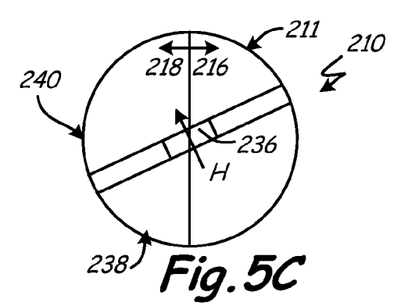

FIGS. 5A-5G illustrates this continuous cyclical operation of dehumidification system 210. FIGS. 5A-5G are schematic views of dehumidification system 210, as viewed from the ends of first air duct 216 and second air duct 218, showing its operation at each stage of continuous cyclical operation. The identification and arrangement of components is as described in FIG. 3. This sequence begins with FIG. 5A which illustrates the operating condition as described above and shown in FIG. 4A. FIG. 5B shows that as wheel-shaped heat transfer device 211 rotates, here in a clockwise manner, the bulk of first wheel section 238 remains in first air duct 216 and the bulk of second wheel section 240 remains in second air duct 218, so that here again, the operation is as described above and shown in FIG. 4A. However, as wheel-shaped heat transfer device 211 continues to rotate, the amount of first wheel section 238 in first air duct 216 starts to equal the amount of first wheel section 238 in second air duct 218, while simultaneously, the amount of second wheel section 240 in second air duct 218 approaches the amount of second wheel section 240 in first air duct 216. This is illustrated in FIG. 5C. As this happens, control system 246 (not shown) begins to reduce the direction of heat H across thermoelectric device 236 in preparation for reversing the direction.

Figure 5D:
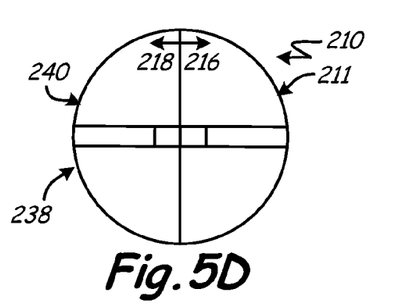
Figure 5E:
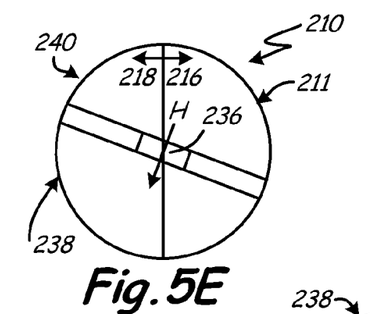
Figure 5F:
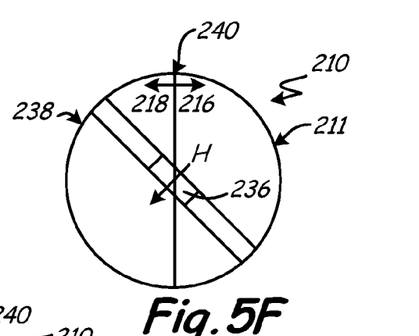
Figure 5G:
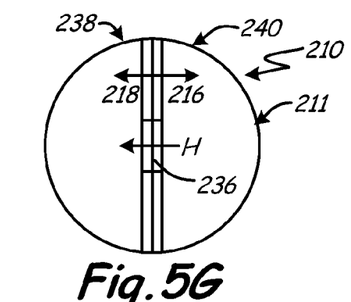

FIG. 5D shows that as wheel-shaped heat transfer device 211 continues to rotate, the amount of first wheel section 238 in first air duct 216 equals the amount of first wheel section 238 in second air duct 218, while simultaneously, the amount of second wheel section 240 in second air duct 218 equals the amount of second wheel section 240 in first air duct 216 and an equilibrium point is reached. At this point, no heat H is pumped across thermoelectric device 236. In FIG. 5E, wheel-shaped heat transfer device 211 has rotated beyond the equilibrium point and more of first wheel section 238 is now in second air duct 218 and more of second wheel section 240 moves into first air duct 216. As this happens, controller 246 (not shown) reverses the direction of heat H across thermoelectric device 236 and the operation is now as described above and shown in FIG. 4B. FIG. 5F shows that as wheel-shaped heat transfer device 211 continues to rotate counter-clockwise, the bulk of first wheel section 238 is in second air duct 218 and the bulk of second wheel section 240 is in second air duct 216, so here again, the operation is as described above and shown in FIG. 4B. Finally, in FIG. 5G, the operation is as described above and illustrated in FIG. 4B; the wheel-shaped heat transfer device has completed one half of its cycle. The balance of the cycle is not shown, but follows the same pattern of operation as described in FIGS. 5A-5G.

Referring to FIG. 3, in the continuous mode of operation, controller 246 can use the temperature and humidity information received from humidity sensor 254 and temperature sensor 256 as well as additional temperature and humidity sensors placed elsewhere in first air duct 216 and second air duct 218 to adjust the rate at which wheel driver/motor 264 rotates wheel-shaped heat transfer device 211 to achieve efficient, continuous operation. Also, with the addition of multiple temperature and humidity sensors, the dehumidification system 210 can achieve accurate control of both the downstream process temperature and humidity. By modulating the flow of heat H across the thermoelectric device 236 to control temperature and humidity while modulating the adsorption/desorption cycle times to control the humidity, the desired control is provided without the need for a separate cooling system.

All embodiments are shown with a counter-current flow between the process air stream and the regenerative air stream because that typically leads to the most efficient mass transport between the air streams. However, all embodiments will function with parallel flow between the air streams.

In any of its embodiments, the present invention controls humidity accurately and independently of any separate temperature control system. Freed of the burden of dehumidification, a separate downstream air conditioning system can be sized to provide only cooling, thereby reducing the size and initial cost of the system and permitting the air conditioning system to operate at its most efficient. This invention is scalable and can be integrated with almost any type of cooling system including vapor compression, adsorption, and evaporative cooling.

Unlike previous dehumidification systems, the heat of condensation is used directly and efficiently to regenerate desiccant. Further, unlike the enthalpy wheel described above, the extent to which moisture is removed from the desiccant is not strictly a function of the moisture level in the regenerative air stream (provided is it not saturated). Transferring the heat of condensation, removed from one side of the present invention, to the opposite side provides the energy necessary to evaporate adsorbed moisture. As a result of the innovative efficiency of this invention, major energy savings are realized.

Although the present invention has been described with reference to preferred embodiments, workers skilled in the art will recognize that changes may be made in form and detail without departing from the spirit and scope of the invention.

The invention claimed is:

1. A system comprising:
   a heat pump for pumping a quantity of heat from a first side of the heat pump to a second side of the heat pump or from the second side of the heat pump to the first side of the heat pump;
   a first passive heat transfer device, wherein the first passive heat transfer device is physically and thermally connected to the first side of the heat pump, the first passive heat transfer device having an exposed surface area for adsorbing and radiating heat;
   a second passive heat transfer device, wherein the second passive heat transfer device is physically and thermally connected to the second side of the heat pump, the second passive heat transfer device having an exposed surface area for adsorbing and radiating heat;
   a desiccant material coating the exposed surfaces of both the first passive heat transfer device and the second passive heat transfer device, for removing moisture from a process air stream and adding moisture to a regenerative air stream; and
   a control system further comprising a controller, control baffles and communication lines for directing the process air stream and the regenerative air stream to flow past the exposed surface of the first and second passive heat transfer devices, and causing the heat pump to pump the quantity of heat from one side of the heat pump to the other side of the heat pump, to thereby control the humidity of the air streams, the temperature of the air streams, or both;
   the controller operating the system in a first mode in which the heat pump conveys heat in a first direction and process air stream enters through a process air stream entrance, traverses the first passive heat transfer device and exits a process air stream exit and the regenerative air stream enters through a regenerative air stream entrance, traverses the second passive heat transfer device and exits a regenerative air stream exit and, upon saturation of the desiccant material on the first passive heat transfer device, operating the system in a second mode in which the heat pump conveys heat in a second direction opposite the first direction and the process air stream enters through a process air stream entrance, traverses the second passive heat transfer device and exits the process air stream exit and the regenerative air stream enters through a regenerative air stream entrance, traverses the first passive heat transfer device and exits the regenerative air stream exit to regenerate the desiccant material on the first passive heat transfer device.

2. The system of claim 1, further including at least one temperature sensor and at least one humidity sensor, both of which are operably connected to the controller and positioned in at least one of the process air stream and the regenerative air stream.

3. The system of claim 1, wherein the heat pump is a thermoelectric device.

4. The system of claim 1, wherein the first passive heat transfer device and the second passive heat transfer device are heat exchangers and the exposed surface areas of each comprise a plurality of fins.

5. The system of claim 1, wherein the first passive heat transfer device and the second passive heat transfer device are heat exchangers and the exposed surface areas of each comprise a plurality of heat pipes.

6. The system of claim 1, wherein the quantity of heat pumped from either the first side or the second side in contact with the process air stream equals a heat of condensation of moisture removed from the process air stream.

7. The system of claim 1, wherein the quantity of heat pumped to either the first side or the second side in contact with the regenerative air stream equals a heat of evaporation of moisture removed from the process air stream.

8. The system of claim 1, wherein
   the heat pump includes a wheel-shaped heat transfer device rotatable between the process air stream and the regenerative air stream, the heat pump coupled to the wheel-shaped heat transfer device for pumping a quantity of heat from one side of the heat pump to the other side of the heat pump;
   the first passive heat transfer device including a first wheel section, wherein the first wheel section is operably connected to the first side of the heat pump, the first wheel section having an exposed surface area for adsorbing heat from and radiating heat to the surroundings and extending outward from the heat pump toward the circumference of the wheel-shaped heat transfer device, and being permeable to air;
   the first passive heat transfer device including a second wheel section, wherein the second wheel section is operably connected to the second side of the heat pump, the second wheel section having an exposed surface area for adsorbing heat from and radiating heat to the surroundings and extending outward from the heat pump toward the circumference of the wheel-shaped heat transfer device, and being permeable to air;

the desiccant material coating the exposed surfaces of the first wheel section and the second wheel section for removing moisture from the process air stream and adding moisture to the regenerative air stream.

9. The system of claim 8, further including at least one temperature sensor and at least one humidity sensor, operably connected to the controller and positioned in at least one of the process air stream and the regenerative air stream.

10. The system of claim 8, wherein the heat pump is a thermoelectric device.

11. The system of claim 8, wherein the first wheel section and the second wheel section are heat exchangers with the exposed surface area comprising a plurality of fins.

12. The system of claim 8, wherein the first wheel section and the second wheel section are heat exchangers with the exposed surface area comprising a plurality of heat pipes.

13. A method comprising:
flowing a process air stream past an exposed surface of a desiccant coated passive heat transfer device in physical and thermal contact with a heat pump;
adsorbing moisture from the process air stream onto the desiccant coating;
pumping a heat of condensation from the adsorbed moisture across the heat pump;
determining a saturation of the desiccant coating of the passive heat transfer device;
reversing the heat pump in response to saturation of the desiccant material on the first passive heat transfer device;
flowing a regenerative air stream past the exposed surface of the desiccant coated passive heat transfer device;
desorbing the moisture into the regenerative air stream using the heat of condensation pumped across the heat pump to provide a heat of evaporation to recharge the desiccant.

14. The method of claim 13, wherein the heat pump is a thermoelectric device.

15. The method of claim 13, wherein the passive heat transfer device is a heat exchanger wherein the exposed surfaces comprise a plurality of fins.

16. The method of claim 13, wherein the passive heat transfer device is a heat exchanger wherein the exposed surfaces comprise a plurality of heat pipes.

17. The method of claim 13, wherein the passive heat transfer device is a wheel-shaped heat transfer device rotating between the process air stream and the regenerative air stream.

18. The method of claim 13, further comprising measuring the temperature of at least one of the process air stream and the regenerative air stream.

19. The method of claim 13, further comprising measuring the humidity of at least one of the process air stream and the regenerative air stream.

20. The method of claim 13, further comprising cooling the process air stream.

* * * * *